United States Patent
Inaba

(10) Patent No.: US 9,804,355 B2
(45) Date of Patent: Oct. 31, 2017

(54) LENS BARREL AND OPTICAL APPARATUS

(71) Applicant: CANON KABUSHIKI KAISHA, Tokyo (JP)

(72) Inventor: Hiroyoshi Inaba, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/667,906

(22) Filed: Mar. 25, 2015

(65) Prior Publication Data

US 2015/0277079 A1    Oct. 1, 2015

(30) Foreign Application Priority Data

Mar. 31, 2014   (JP) ................................ 2014-070781

(51) Int. Cl.
```
G02B 7/02      (2006.01)
G02B 7/04      (2006.01)
G03B 3/02      (2006.01)
G03B 5/00      (2006.01)
G03B 17/14     (2006.01)
```
(52) U.S. Cl.
CPC ................ *G02B 7/04* (2013.01); *G03B 3/02* (2013.01); *G03B 5/00* (2013.01); *G03B 17/14* (2013.01); *G03B 2205/0046* (2013.01); *G03B 2205/0053* (2013.01)

(58) Field of Classification Search
USPC ....... 359/811, 813, 815, 819, 820, 821, 822, 359/823, 824, 826
See application file for complete search history.

(56) References Cited

U.S. PATENT DOCUMENTS

| | | | |
|---|---|---|---|
| 7,466,504 B1 | 12/2008 | Koyama | |
| 2012/0113535 A1* | 5/2012 | Okuda | G02B 7/023 359/823 |

FOREIGN PATENT DOCUMENTS

JP        2009031424 A     2/2009

* cited by examiner

*Primary Examiner* — Brandi Thomas

(74) *Attorney, Agent, or Firm* — Rossi, Kimms & McDowell LLP

(57) ABSTRACT

Provided is a lens barrel which causes at least one lens to be movable in an optical axis direction. The lens barrel includes a first tube; a second tube that holds the lens and is movable relatively to the first tube in the optical axis direction; and either one of the first and the second tube includes a first and a second roller which contact with the other tube in a plane orthogonal to the optical axis direction, and the first roller and the second roller are rotable in accordance with the relative movement of the second tube and movable in a direction orthogonal to the optical axis direction at the time of the movement of the second tube. One tube includes a limiting member for limiting the movement of the second roller in the direction orthogonal to the optical axis direction and in a direction to the other tube.

11 Claims, 4 Drawing Sheets

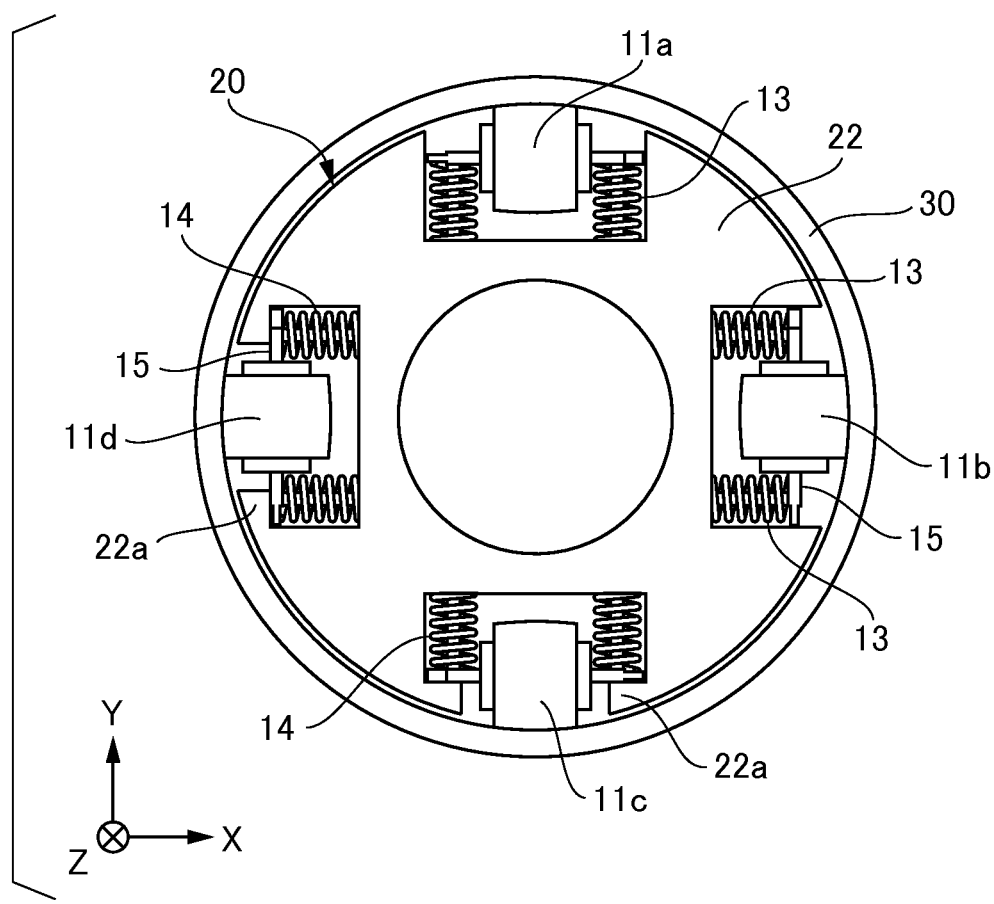

LENS BARREL AND OPTICAL APPARATUS

BACKGROUND OF THE INVENTION

Field of the Invention

The present invention relates to a lens barrel and an optical apparatus.

Description of the Related Art

Conventionally, a lens barrel which is used as an interchangeable lens in an optical apparatus such as a digital still camera, a video camera, or the like has a mechanism by which a lens (optical element) is movable therein in the optical axis direction. For example, in such a moving mechanism, in order to suppress the occurrence of engagement backlash, rollers each of which rotates about an axis orthogonal to the optical axis and is urged by spring are provided at two positions equally arranged by 120 degrees as viewed from the optical axis direction on the outside of a moving group for holding a lens. Likewise, rollers are also provided at two other cross-sectional positions spaced apart in the optical axis direction. With the aid of such a structure, the roller is pressed against a fixed barrel at the outer periphery side of the moving group, resulting in suppressing the occurrence of backlash which may occur during movement of the moving group. Japanese Patent Laid-Open No. 2009-31424 discloses a lens barrel in which a first moving frame serving as an outside moving frame and a second moving frame serving as an inside moving frame for holding a lens are held by four rollers each of which is urged by spring and rotates in association with a relative movement between these moving frames.

However, in the technique disclosed in Japanese Patent Laid-Open No. 2009-31424, if some impact is applied to the entire lens barrel, the offset of the roller occurs in a direction orthogonal to the optical axis, i.e., the offset of the roller occurs at the central position of the optical axis of the first moving group, resulting in an adverse effect on optical performance. In addition, in the technique disclosed in Japanese Patent Laid-Open No. 2009-31424, the area of contact by a roller surface of the roller is small, and thus, dents may be formed on the contact surface on the outside fixed barrel side when the above impact is applied to the entire lens barrel. The dents cause the roller to displace in an unintended direction during normal movement of the moving group, which is not preferable because of the occurrence of movement of an imaging screen or a projection screen, i.e., an image shake phenomenon.

SUMMARY OF THE INVENTION

The present invention has been made under such circumstances and provides, for example, a lens barrel which is advantageous for suppressing the offset of a lens being movably held.

According to an aspect of the present invention, a lens barrel having a lens movable in an optical axis direction, the lens barrel comprising: a first tube; and a second tube that holds the lens and is movable relatively to the first tube in the optical axis direction, wherein either one of the first tube and the second tube includes a first roller and a second roller which are brought into contact with the other tube in a plane orthogonal to the optical axis direction, wherein the first roller and the second roller are rotable in accordance with the relative movement of the second tube and movable in a direction orthogonal to the optical axis direction at the time of the relative movement of the second tube, and wherein one tube includes a limiting member for limiting the movement of the second roller in the direction orthogonal to the optical axis direction and in a direction to the other tube.

Further features of the present invention will become apparent from the following description of exemplary embodiments with reference to the attached drawings.

BRIEF DESCRIPTION OF THE DRAWINGS

FIG. 5 is a cross-sectional view illustrating a configuration of a movable section and a reference barrel according to a second embodiment.

DESCRIPTION OF THE EMBODIMENTS

Hereinafter, preferred embodiments of the present invention will be described in detail with reference to the drawings.

First Embodiment

Figure 1:
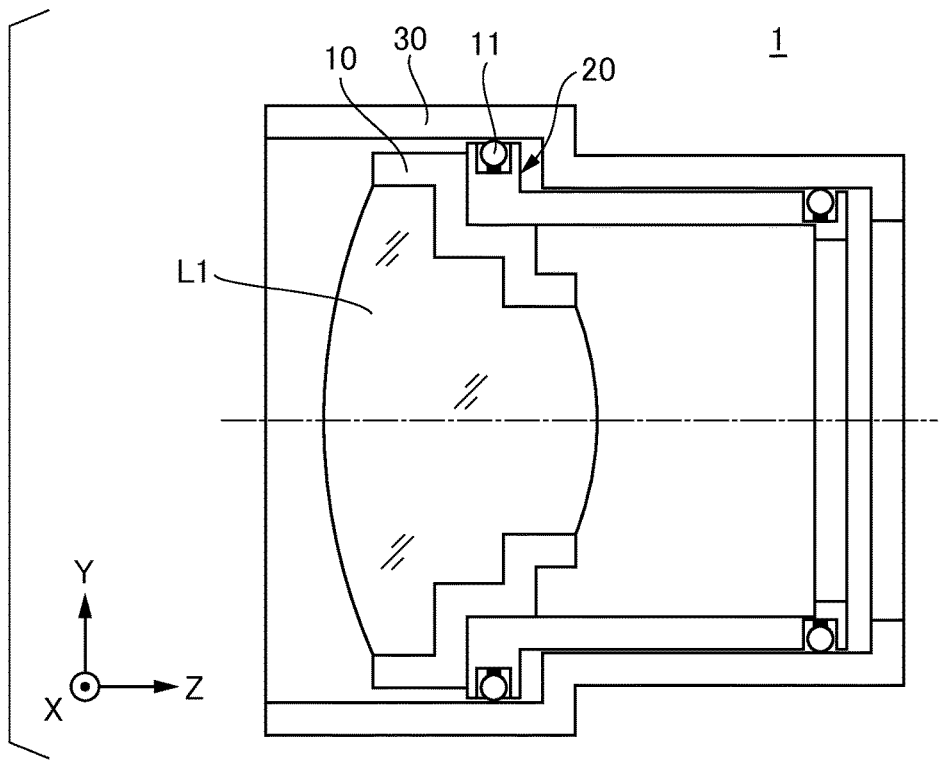
FIG. 1 is a diagram illustrating a configuration of a lens barrel according to a first embodiment of the present invention.

Firstly, a description will be given of a lens barrel according to a first embodiment of the present invention. FIG. 1 is a schematic cross-sectional view illustrating a configuration of a lens barrel 1 according to the present embodiment. As an example, the lens barrel 1 is an interchangeable lens which is attachable/detachable to/from an imaging apparatus (optical apparatus) such as a digital still camera provided with an image sensing element, a still camera using a silver salt film, or the like. It should be noted that the lens barrel 1 may be built in an imaging apparatus but may also be built in, for example, an interchangeable lens to be attached/detached to/from a projection apparatus such as a projector or the like and the projection apparatus without limiting the imaging apparatus. The lens barrel 1 also has a moving mechanism for allowing the lens L1 to be movable in the optical axis direction with regard to the zooming function or the focusing function. The zooming or focusing adjustment may be made by a photographer's manual operation or may also be made by an automatic operation based on an operation command from the imaging apparatus side. In FIG. 1 and the following drawings, the Z axis is aligned in a direction parallel to the optical axis (a chain-dotted line in FIG. 1) and the X axis and the Y axis which are mutually orthogonal to each other are aligned in a plane perpendicular to the Z axis. In particular, it is assumed that the Y-axis direction is the vertical direction in a state where a photographer normally holds an imaging apparatus or in a state where an imaging apparatus is normally mounted on a flat bed.

The lens barrel 1 includes a lens L1, a holding frame 10 that holds the lens L1, a reference barrel 30 that is located on the outer periphery side of the holding frame 10, and a movable section 20 that is secured to the holding frame 10 and is movable relative to the reference barrel 30 via rollers 11. While FIG. 1 shows a configuration in which a roller group is arranged at two positions in the optical axis direction, a description will be given below of a roller group on the object side (side near the lens L1) in the optical axis direction for ease of explanation. The configuration of the other roller group may be the same as that of the roller group. While the lens (optical element) L1 is represented by a single lens in FIG. 1, the lens L1 may also be a lens group consisting of a plurality of lenses. While, in the present embodiment, the lens barrel 1 includes a single lens (lens group) L1, the lens barrel 1 may also include a plurality of lens groups which are movable independently from one another. The holding frame 10 is a substantially cylindrical holding member that holds (secures) the lens L1 in the inside thereof. The reference barrel (first tube) 30 is a substantially cylindrical reference member. While a description will be given by taking the reference barrel 30 as a fixed barrel in the present embodiment, a member corresponding to the reference barrel 30 may also be a movable barrel which is movable relative to a fixed member on the further outer periphery side depending on the configuration of the lens barrel.

Figure 2:
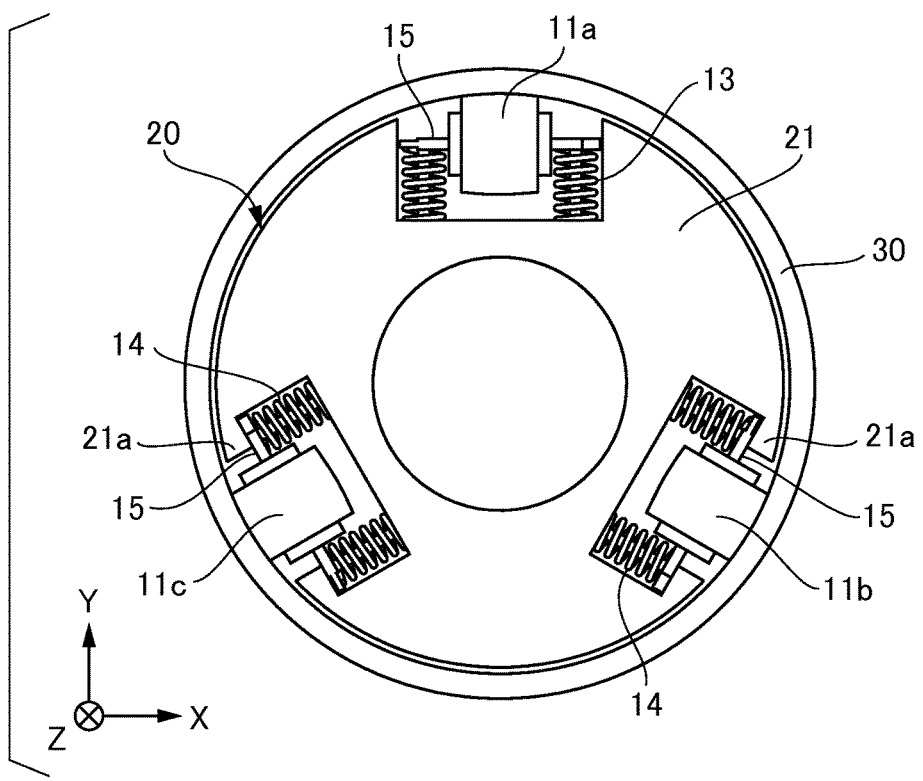
FIG. 2 is a diagram illustrating a configuration of a movable section and a reference barrel according to the first embodiment.

FIG. 2 is a schematic cross-sectional view illustrating a configuration of the movable section 20 and the reference barrel 30 as viewed from the optical axis direction. The movable section 20 includes a movable section main body 21, a plurality of (three in the present embodiment) rollers 11 (11a to 11c) which are disposed in the movable section main body 21, and springs 13 and 14 for applying a force to the rollers 11. In FIG. 2, the rollers 11 are exaggeratedly shown large as compared with the size of the entire movable section main body 21 from the viewpoint of simplification of explanation. The movable section main body (second tube) 21 is movable in the optical axis direction (the relative position thereof relative to the reference barrel 30 is variable) without being brought into contact with the inner surface of the reference barrel 30. The movable section main body 21 is, for example, a cylindrical member that secures the holding frame 10 on the object side in the optical axis direction. In other words, the movable section main body 21 indirectly holds the lens L1 via the holding frame 10. The three rollers 11 may be independently provided at three positions equally arranged by 120 degrees as viewed from the optical axis direction. In this case, the first roller 11a rolls to cause the movable section 20 to be movable in the optical axis direction while the roller surface is brought into contact with the inner surface of the reference barrel 30 on an extension of the Y-axis direction positive side perpendicular to the optical axis. On the other hand, each of the second roller 11b and the third roller 11c rolls to cause the movable section 20 to be movable in the optical axis direction while the roller surface is brought into contact with the inner surface of the reference barrel 30 on another extension of the Y-axis direction positive side perpendicular to the optical axis. Each of the rollers 11 has an axis of rotation 15, and each of the axis of rotations 15 is supported by the movable section main body 21 via an elastic component which imparts a force in a direction orthogonal to the optical axis (in the present embodiment, from the optical axis toward the outer periphery side).

Figure 3A:
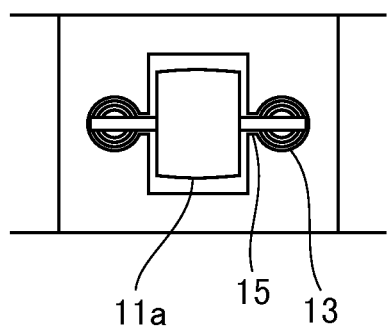
FIG. 3A is a plan view illustrating a first roller and its periphery as viewed from the outer periphery side toward the optical axis side.
Figure 3B:
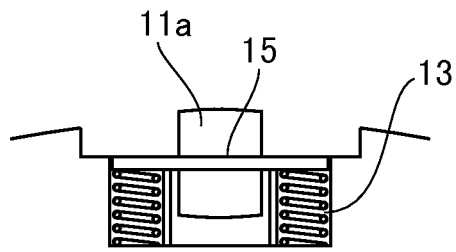
FIG. 3B is a cross-sectional view illustrating a first roller and its periphery as viewed from the optical axis direction.

Here, as shown in FIG. 2, the axis of rotation 15 of the first roller 11a is supported by two springs 13 serving as elastic components and is movable in a direction orthogonal to the optical axis without being limited to its position in a direction orthogonal to the optical axis. In other words, the first roller 11a urges the movable section 20 from the optical axis toward the inner surface of the reference barrel 30 together with the support by the second roller 11b and the third roller 11c to be described below. Hereinafter, for convenience of description, the spring 13 for supporting the first roller 11a is referred to as an "urging spring", and a force imparted by the urging spring 13 is referred to as an "urging force". FIGS. 3A and 3B are schematic views specifically illustrating the first roller 11a and its peripheral configuration. FIG. 3A is a plan view as viewed from the outer periphery side toward the optical axis side and FIG. 3B is a cross-sectional view as viewed from the same direction as FIG. 2.

Figure 4A:
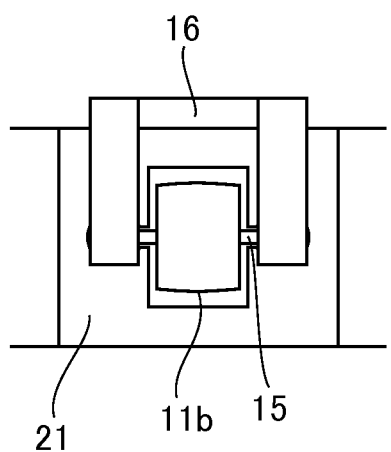
FIG. 4A is a plan view illustrating a second roller and its periphery as viewed from the outer periphery side toward the optical axis side.
Figure 4B:
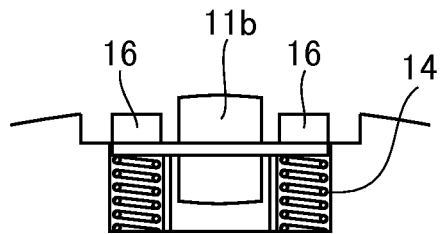
FIG. 4B is a cross-sectional view illustrating a second roller and its periphery as viewed from the optical axis direction.

In contrast, the axis of rotation 15 of each of the second roller 11b and the third roller 11c (rollers other than the first roller 11a) is supported by two springs 14 so as to be movable in a direction orthogonal to the optical axis as in the first roller 11a. It should be noted that, as shown in FIG. 2, the movable section main body 21 has an abutment portion (a limiting member) 21a for limiting the position (displacement) of the axis of rotation 15 in a direction orthogonal to the optical axis, and each axis of rotation 15 is normally abutted against the abutment portion 21a by receiving a force imparted by each spring 14. With this arrangement, each axis of rotation 15 cannot be moved toward the outer periphery side (the reference barrel 30 side) than the abutment portion 21a in a direction orthogonal to the optical axis. Hereinafter, for convenience of description, the spring 14 for supporting each of the second roller 11b and the third roller 11c refers to a "damper spring" and a force imparted by the damper spring 14 refers to a "damper force". FIGS. 4A and 4B are schematic views specifically illustrating the second roller 11b and its peripheral configuration. FIG. 4A is a plan view as viewed from the outer periphery side toward the optical axis side and FIG. 4B is a cross-sectional view as viewed from the same direction as FIG. 2. The third roller 11c is also the same as the second roller 11b in FIGS. 4A and 4B. For example, as shown in FIGS. 4A and 4B, the abutment portion 21a provided in the movable section main body 21 is a metal fitting (or a pressing member corresponding thereto) 16 for limiting the positions of the axis of rotation 15 and the damper spring 14 and the metal fitting 16 may be secured to the movable section main body 21. As described above, at least one (in the present embodiment, both the second roller 11b and the third roller 11c) of the rollers 11 of which the positions are limited in a direction orthogonal to the optical axis is arranged on the side that receives the own weight of the movable section main body 21. With this arrangement, one roller of the plural rollers 11 may be efficiently responsible for imparting an urging force and the rest of them normally may act only as the rotational support and be efficiently responsible as a damper for absorbing impact upon receiving it. Thus, it is preferable that the arrangement of the plural rollers 11 be determined in consideration of the attitude of the lens barrel 1 in normal use.

Next, a description will be given of a force to be imparted by the urging spring 13 and the damper spring 14 based on the assumption that the total weight of the movable section 20 and the holding frame 10 (including the lens L1) (hereinafter referred to as "moving group") secured to the movable section 20 is 1 kgf. In the following consideration, a description will be given based on the assumption that 1 kgf is about 10 N for reasons of simplicity. Firstly, in order to typically displace the entire mechanism corresponding to the moving group in a specific peripheral direction, in other words, in order to bias the entire mechanism toward the inner surface of the member corresponding to the reference barrel 30, an urging force greater than two times the own weight of the entire mechanism is required. In other words, the urging spring 13 for the first roller 11a needs to impart an urging force of 20 N (10 N×two times). In this example, since two urging springs 13 are used for one first roller 11a, an urging force required of one urging spring 13 is 10 N.

On the other hand, in the case of the second roller 11b and the third roller 11c, it is preferable that a damper force required for limiting the displacement of the entire mechanism in a direction orthogonal to the optical axis is an extent (which is retractable toward a direction opposite to the direction of such force is exerted on) for pressing against an urging force (a contact force between the first roller 11a and the reference barrel 30) urged by the urging spring 13 as appropriate and for absorbing an abnormal force applied from an exterior. In other words, the damper force needs to be set to greater than the urging force (the contact force) urged by the urging spring 13. For example, in order to enable the second roller 11b and the third roller 11c or their respective axis of rotations 15 to be retractable on the optical axis side without deforming them when the impact is applied to the entire lens barrel 1, it is preferable that the damper force be about two times of (the urging force of the urging spring 13+its own weight). Hence, the damper force, i.e., a force for bringing the second roller 11b or the third roller 11c into abutment against the abutment portion 21a is 60 N which is (20 N+10 N)×two times. In this example, since two damper springs 14 are used for the second roller 11b and the third roller 11c, respectively, a damper force required of one damper spring 14 is 30 N.

Next, a description will be given of the operation performed by the movable section 20 (moving group) based on the above assumption. Firstly, a force of 20 N imparted by the first roller 11a (two urging springs 13) is applied to the inner surface of the reference barrel 30. The action-reaction forces imparted by the three rollers 11 are balanced and the remaining second roller 11b and third roller 11c are pressed against each other with a force of 20 N, so that the movable section 20 is urged into anti-backlash engagement with the inner surface of the reference barrel 30 (in a direction orthogonal to the optical axis). When the movable section 20 receives a driving force from a motor (not shown) in this state, the rollers 11 roll while being brought into contact with the inner surface of the reference barrel 30, so that the movable section 20 can smoothly move in the optical axis direction while being urged into anti-backlash engagement with the inner surface of the reference barrel 30.

Here, assume the case where the impact is applied to the entire lens barrel 1 during movement of the movable section 20, i.e., the case where the lens barrel 1 falls and collides against the ground or the like given that the second roller 11b is directly below in the vertical direction (the Y-axis direction negative side). In this case, the reference barrel 30 is stopped by the collision against the ground or the like. In contrast, if the movable section 20 continues its movement toward the optical axis direction and the impact of a predetermined force (e.g., 6 G or greater) is further applied thereto, the damper springs 14 for the second roller 11b are compressed to a pressure exceeding the spring pressure of 60 N in total. When the damper springs 14 are compressed, the axis of rotation 15 for supporting the second roller 11b is spaced apart from the abutment portion 21a toward the optical axis direction (the second roller 11b moves in a direction opposite to a rolling surface of the second roller 11b with which an inner surface of the reference barrel 30 comes into contact), so that the movable section main body 21 is brought into contact with the inner surface of the reference barrel 30. In order to deal with such a contact, it is assumed that the reference barrel 30 and the movable section main body 21 are formed of a material which has a sufficient strength to resist deformation even if some scratches are acceptable. After the movable section main body 21 is brought into contact with the inner surface of the reference barrel 30, the movable section 20 is also stopped with respect to the reference barrel 30, resulting in cushioning the impact G with the elapse of time. From the time point when the impact becomes below 5 G, the damper springs 14 push back the total of the weight of the moving group and the damper force, so that the axis of rotation 15 of the second roller 11b is pushed back until it is brought into abutment against the abutment portion 21a to return to the original state.

With this arrangement, if the impact is applied to the lens barrel 1, scratches may occur on the contact portion, which is in contact with the movable section main body 21, on the inner surface of the reference barrel 30 the inner surface of the reference barrel 30, scratches may not readily occur on the contact surface with the rollers 11. In other words, even if such an impact is applied to the lens barrel 1, the rollers 11 are less prone to breakage and no scratch (or minimal scratches) occurs on the contact surface of the reference barrel 30 upon rolling of the rollers 11, and thus, the lens barrel 1 is unaffected (or less prone to be affected) by a difference in step of scratches. Thus, the lens barrel 1 may suppress the offset of the movable section 20 (i.e., the lens L1), resulting in suppressing an adverse effect on optical performance, such as image shake.

As described above, according to the present embodiment, a lens barrel which is advantageous for suppressing the offset of a lens being movably held may be provided. In addition, an optical apparatus having excellent optical performance, which is less affected by image shake or the like, may be provided by the presence of the lens barrel.

Second Embodiment

Next, a description will be given of a lens barrel according to a second embodiment of the present invention. While, in the first embodiment, the number of the rollers 11 which are disposed in the movable section 20 is three, a description will be given in the present embodiment by taking a lens barrel in which the number of the rollers 11 is four. FIG. 5 is a schematic cross-sectional view illustrating a configuration of the movable section 20 and the reference barrel 30 in the present embodiment as viewed from the optical axis direction. The components of the lens barrel according to the present embodiment, which are basically the same as those of the lens barrel 1 according to the first embodiment, are denoted by the same reference numerals, and description thereof is omitted.

A movable section 20 in the present embodiment has a movable section main body 22 corresponding to the movable section main body 21 in the first embodiment. In the movable section main body 22, four rollers 11 may be arranged at four positions equally arranged by 90 degrees in the positive and negative sides of the X axis and the positive and negative sides of the Y axis as viewed from the optical axis direction based on the assumption that the Z axis matches the optical axis. In this case, the first roller 11a and the second roller 11b which are respectively arranged on the Y-axis direction positive side (upper side) and the X axis direction positive side (right side) correspond to the first roller 11a which imparts an urging force to the inner surface of the reference barrel 30 in the first embodiment. On the other hand, the third roller 11c and the fourth roller 11d which are respectively arranged on the Y-axis direction negative side (lower side) and the X-axis direction negative side (left side) correspond to the second roller 11b or the third roller 11c of which the position is limited in a direction orthogonal to the optical axis in the first embodiment. In other words, the movable section main body 22 has two abutment portions 22a as in the abutment portion 21a in the first embodiment. As described above, in the present embodiment, a roller for imparting an urging force and a roller of which the position is limited in a direction orthogonal to the optical axis are pairwisely arranged at opposed positions at 180 degrees with respect to each other, the movable section 20 (moving group) is balanced separately in an upper-lower direction (vertical direction) and a left-right direction. With the aid of an arrangement of the rollers 11, the rollers in a direction along which the impact is applied directly absorbs the impact, whereas the rollers in a direction orthogonal to the direction along which the impact is applied only undergo sideway slippage and some displacement on the inner surface of the reference barrel 30. In practice, it is highly probable that the lens barrel falls not in a vertical direction but in an oblique direction relative to the positions at which the rollers 11 are arranged. In such a case, each roller 11 bears the impact of the force generated by vector decomposition in the direction along which the impact is applied. According to the present embodiment, the same effect as that in the first embodiment may be provided even if the number of rollers disposed in the movable section 20 increases.

Third Embodiment

Figure 6:
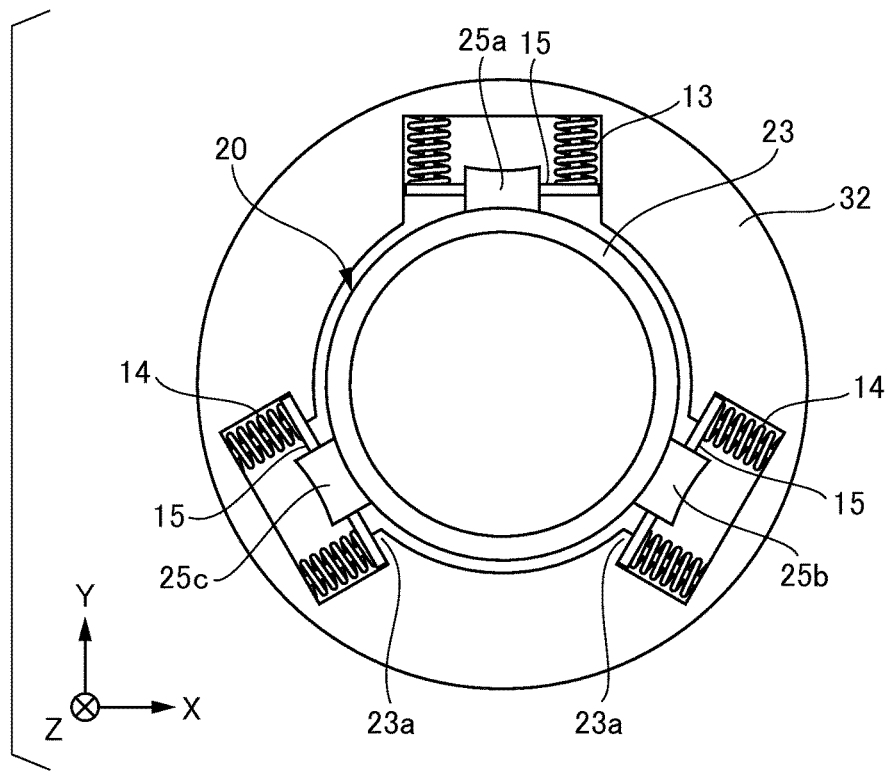
FIG. 6 is a cross-sectional view illustrating a configuration of a movable section and a reference barrel according to a third embodiment.

Next, a description will be given of a lens barrel according to a third embodiment of the present invention. While, in the above embodiments, the plural rollers 11 are disposed in the movable section 20, a description will be given in the present embodiment by taking a lens barrel in which the plural rollers 11 are disposed on the reference barrel side. FIG. 6 is a schematic cross-sectional view illustrating a configuration of the movable section 20 and a reference barrel 32 in the present embodiment as viewed from the optical axis direction. Although a first roller 25a to a third roller 25c in the present embodiment play an opposite role in a direction along which the force is applied, the first roller 25a to the third roller 25c correspond to the first roller 11a to the third roller 11c in the first embodiment, respectively. More specifically, abutment portions 23a for limiting the positions of the second roller 25b and the third roller 25c are disposed on the reference barrel 32 side for reasons of configuration. In this case, since each roller 25 is adapted to fit into the profile of the movable section main body 23, it is preferable that the roller diameter of each roller 25 is smallest at the center point but largest at the ends thereof. According to the present embodiment, the same effect as that in the first embodiment may be provided even if the plural rollers are disposed on the reference barrel instead of the movable section main body.

Fourth Embodiment

Figure 7:
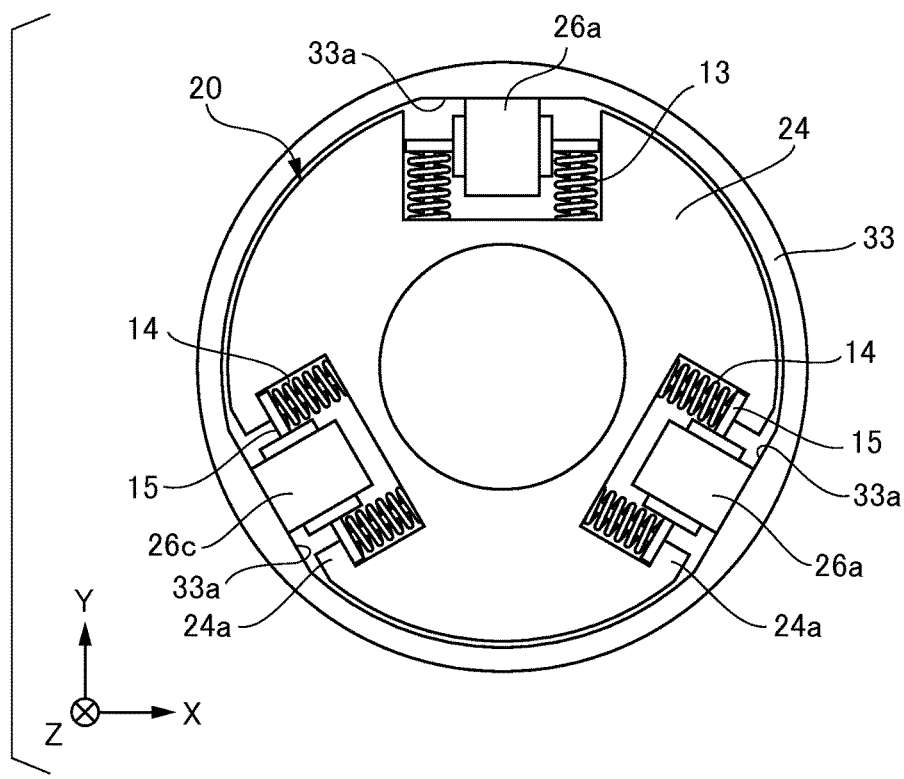
FIG. 7 is a cross-sectional view illustrating a configuration of a movable section and a reference barrel according to a fourth embodiment.

Next, a description will be given of a lens barrel according to a fourth embodiment of the present invention. In the first and second embodiments, the reference barrel 30 has a generally cylindrical shape and the inner surface thereof has curved surface as viewed from the optical axis direction. The shape of the roller surface of each roller 11 is also designed such that the roller diameter of each roller 11 is largest at the center point but smallest at the ends thereof along the shape of the contact area of the inner surface of the reference barrel 30. In contrast, a description will be given in the present embodiment by taking a lens barrel in which so-called straight rollers each of which the roller diameter is uniform at both the center point and the ends thereof are employed as the plural rollers 11. FIG. 7 is a schematic cross-sectional view illustrating a configuration of the movable section 20 and a reference barrel 33 in the present embodiment as viewed from the optical axis direction. As shown in FIG. 7, for example, a first roller 25a to a third roller 25c respectively corresponding to the first roller 11a to the third roller 11c in the first embodiment are straight rollers. The reference barrel 33 has planar portions 33a as areas with which the roller surfaces of the rollers 25 are respectively brought into contact. It is preferable that the planar portions 33a are provided (formed) in consideration of the weight and durability of the moving group but the planar portions 33a are not necessarily provided if the weight of the moving group is light. According to the present embodiment, the same effect as that in the first embodiment may be provided even if the straight rollers are employed as the rollers.

In the first embodiment (and the above embodiments related thereto), the movable section 20 (more specifically, the movable section main body 21) in which the rollers 11 are disposed and the holding frame 10 for holding the lens L1 are separate members. However, the present invention is not limited thereto but the movable section main body 21 may be integrated with the holding frame 10.

In the fourth embodiment, the areas with which the roller surfaces are brought into contact are planar by employing straight rollers. Such a configuration also provides an effect of suppressing the rotation of the entire moving group about the optical axis with respect to the inner surface of the reference barrel 30. In association with this, there may also be a request to suppress the rotation of the entire moving group about the optical axis in the first to third embodiments. In this case, rotation-stop mechanism may also be provided such that a combination of a key and a key groove is attached to (formed on) the movable section main body or the reference barrel or the entire areas with which the roller surfaces of the plural rollers are brought into contact are grooved to regulate the direction of travel.

While, in the above embodiments, a spring is employed as an elastic component for imparting a force to a roller in consideration of easy selectability and low cost, it is not limited thereto as long as it imparts a desired force to a roller and is installable in the movable section or the reference barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-070781 filed on Mar. 31, 2014, which is hereby incorporated by reference herein in its entirety.

What is claimed is:

1. A lens barrel having a lens movable in an optical axis direction, the lens barrel comprising:
a first tube; and
a second tube that holds the lens,
wherein the first tube and the second tube are relatively movable in the optical axis direction,
wherein either one of the first tube and the second tube includes a first roller and a second roller which are brought into contact with the other tube in a plane orthogonal to the optical axis direction,
wherein the first roller and the second roller are rotatable in accordance with the relative movement of the second tube and movable in a direction orthogonal to the optical axis direction, and
wherein the one tube is configured not to limit a movement of the first roller in a direction to the other tube and to limit a movement of the second roller in the direction to the other tube.

2. The lens barrel according to claim 1, wherein the first tube is a cylindrical member which internally supports the second tube and the first roller and the second roller are equally arranged inside the cylindrical member in the optical axis direction.

3. The lens barrel according to claim 1, wherein each of the first roller and the second roller has an axis of rotation and includes an elastic component which imparts a force to the axis of rotation in the direction orthogonal to the optical axis direction.

4. The lens barrel according to claim 1, wherein the second roller is movable in a direction opposite to a rolling surface of the second roller with which an inner surface of the other tube comes into contact upon receipt of a predetermined force.

5. The lens barrel according to claim 1, wherein a force required for displacing the second roller is greater than a contact force between the first roller and the other tube.

6. The lens barrel according to claim 1, wherein the second roller is arranged on the side that receives the own weight of the second tube.

7. The lens barrel according to claim 1, wherein the area contacted by a rolling surface of the first roller and the second roller is planar.

8. An optical apparatus comprising:
a camera; and
a lens barrel having a lens movable in an optical axis direction,
wherein the lens barrel comprises:
a first tube; and
a second tube that holds the lens,
wherein the first tube and the second tube are relatively movable in the optical axis direction,
wherein either one of the first tube and the second tube includes a first roller and a second roller which are brought into contact with the other tube in a plane orthogonal to the optical axis direction,
wherein the first roller and the second roller are rotatable in accordance with the relative movement of the second tube and movable in a direction orthogonal to the optical axis direction, and
wherein the one tube is configured not to limit a movement of the first roller in a direction to the other tube and to limit a movement of the second roller in the direction to the other tube.

9. The lens barrel according to claim 1, wherein both of the first and second rollers are in contact with the other tube.

10. The lens barrel according to claim 1, wherein each of the first and second rollers is in contact with the other tube in a plane parallel to the optical axis direction.

11. The lens barrel according to claim 1, wherein the limiting member is disposed between the second roller and the other tube.

* * * * *